(12) United States Patent
Murrell

(10) Patent No.: US 12,485,936 B1
(45) Date of Patent: Dec. 2, 2025

(54) PORTABLE TOILET SYSTEM AND MECHANISMS

(71) Applicant: David Murrell, Brunswick, OH (US)

(72) Inventor: David Murrell, Brunswick, OH (US)

(*) Notice: Subject to any disclaimer, the term of this patent is extended or adjusted under 35 U.S.C. 154(b) by 112 days.

(21) Appl. No.: 18/521,529

(22) Filed: Nov. 28, 2023

Related U.S. Application Data

(60) Provisional application No. 63/385,305, filed on Nov. 29, 2022.

(51) Int. Cl.
| | |
|---|---|
| *B61D 35/00* | (2006.01) |
| *E03D 5/014* | (2006.01) |
| *E03D 5/016* | (2006.01) |
| *E03D 11/11* | (2006.01) |

(52) U.S. Cl.
CPC .......... *B61D 35/007* (2013.01); *E03D 5/014* (2013.01); *E03D 5/016* (2013.01); *E03D 11/11* (2013.01)

(58) Field of Classification Search
CPC ....... B61D 35/007; E03D 5/014; E03D 5/016; E03D 11/11; A47K 11/02; A47K 11/035
USPC ......... 4/111.6, 317, 318, 321–323, 459, 460, 4/476, 479
See application file for complete search history.

(56) References Cited

U.S. PATENT DOCUMENTS

| | | | | |
|---|---|---|---|---|
| 3,624,665 A | * | 11/1971 | Klingle, Sr. ......... | A47K 11/035 4/321 |
| 3,655,048 A | * | 4/1972 | Pergola ................. | C02F 3/1242 210/221.1 |
| 3,824,632 A | * | 7/1974 | Bach ....................... | E03D 5/016 4/323 |
| 11,753,838 B1 | * | 9/2023 | Hill ....................... | B61D 35/007 4/483 |
| 2008/0307574 A1 | * | 12/2008 | Villgren ................. | A47K 11/02 4/460 |

* cited by examiner

*Primary Examiner* — Tuan N Nguyen
(74) *Attorney, Agent, or Firm* — Sisson & Banyas, Attorneys at Law, LLC; Jeffrey J. Banyas

(57) ABSTRACT

An improved portable toilet comprises one or more of a flushing mechanism, a urinal flushing mechanism, a solid/liquid separation system, and/or a door opening mechanism.

5 Claims, 8 Drawing Sheets

PORTABLE TOILET SYSTEM AND MECHANISMS

CROSS REFERENCES AND PRIORITIES

This application claims priority from U.S. Provisional Application No. 63/385,305 filed on 29 Nov. 2022 the teachings of which are incorporated by reference herein in their entirety.

BACKGROUND

Portable toilets, also sometimes referred to as port-a-potties, are utilized at a variety of remote locations where permanent toilet systems have not been—or cannot be—installed. Common locations include construction sites, outdoor concert and sporting event venues, and public parks.

The typical portable toilet comprises an outer structure—sometimes referred to as a shell—having a door which is opened by hand to allow a user access to the toilet facilities. The toilet facilities often consist of little more than a bench comprising a hole to which a toilet seat is connected. The user sits on the toilet seat and defecates and/or urinates through the hole into a waste holding tank.

In some embodiments, the portable toilet may also include a separate urinal attached to a sidewall of the shell. As a user urinates into the urinal, the urine passes through a conduit into the waste holding tank.

Periodically, waste in the waste holding tank is removed. This is typically achieved by a truck mounted tank having a suction pump. A hose is inserted into the waste holding tank through the hole in the bench—or alternatively attached to a clean-out pipe which is connected to the waste holding tank. Suction from the suction pump then extracts the waste from the waste holding tank into the truck mounted tank.

In practice, current portable toilet systems are considered undesirable and are generally only utilized as a last resort when traditional restroom facilities are unavailable or impractical. Current portable toilet systems are often considered unsanitary owing to the lack of clean water flushing mechanisms, odor buildup within the shell from the waste holding tank—the contents of which are exposed to the interior of the shell via the hole in the bench, and microbe buildup on high touch surfaces such as the door handle or toilet seat. The need exists, therefore, for a portable toilet which provides a more sanitary user experience.

SUMMARY

Described herein is a flushing mechanism for a portable toilet. The flushing mechanism may comprise a clean water holding tank, a pump, a pressure tank, an actuator, a first foot activated pedal, a toilet bowl, and a waste holding tank. The pressure tank may comprise a pressure tank inlet, a diaphragm, and a pressure tank outlet fluidly connected to a pressure release valve.

The clean water holding tank may be fluidly connected to the pump. The pump may be fluidly connected to the pressure tank inlet. The pressure release valve may be fluidly connected to the toilet bowl. At least a portion of a fluid connection line between the pressure release valve and the toilet bowl may reside within an upper ring of the toilet bowl. The portion of the fluid connection line residing within the upper ring of the toilet bowl may comprise at least one perforation. The toilet bowl may be fluidly connected to the waste holding tank. A fluid connection between the toilet bowl and the waste holding tank may comprise a dump valve. The actuator may be mechanically connected to the first foot activated pedal. The first foot activated pedal may also be mechanically connected to the dump valve.

The dump valve may be configured to open when the first foot activated pedal is in a compressed or a partially compressed position and close when the first foot activated pedal is in a fully uncompressed position. The pressure release valve may be configured to open when the first foot activated pedal is in a compressed or partially compressed position and close when the first foot activated pedal is in a fully uncompressed position.

In some embodiments, the clean water holding tank may be formed within a wall of a portable toilet shell. The wall of the portable toilet shell may be selected from the group consisting of a top wall, one or more side walls, a bottom wall, and combinations thereof.

In certain embodiments, the pump may be an electrically activated pump. In some embodiments, the pressure tank may further comprise a limiting valve fluidly connected to the pressure release valve. The fluid connection line between the pressure release valve and the toilet bowl may include the limiting valve.

Also described herein is a urinal flushing mechanism for a portable toilet. The urinal flushing mechanism may comprise a clean water holding tank, a second foot activated pedal, a valve assembly, a urinal, and a waste holding tank. The valve assembly may comprise an upper valve mechanism, a lower valve mechanism, and a valve assembly body.

The clean water holding tank may be fluidly connected to the upper valve mechanism. The lower valve mechanism may be fluidly connected to the urinal. The urinal may be fluidly connected to the waste holding tank.

The upper valve mechanism may be configured to be in an upper valve mechanism closed position when the second foot activated pedal is in a fully uncompressed position. The upper valve mechanism may be configured to be in an upper valve mechanism opened position or an upper valve mechanism partially opened position when the second foot activated pedal is in a partially compressed or fully compressed position.

The lower valve mechanism is configured to be in a lower valve mechanism opened position or a lower valve mechanism partially opened position when the second foot activated pedal is in the fully uncompressed position. The lower valve mechanism may be configured to be in a lower valve mechanism closed position when the second foot activated pedal is in the partially compressed or fully compressed position.

In some embodiments, the upper valve mechanism is a first ball valve. In certain such embodiments, the lower valve mechanism is a second ball valve.

In other embodiments, the upper valve mechanism may comprise a first pair of plates. In some such embodiments, the lower valve mechanism may comprise a second pair of plates. The first pair of plates and the second pair of plates may be slideably connected to one another within the valve assembly body.

In some embodiments, the urinal flushing mechanism may further comprise a urine trap located in the fluid connection between the waste holding tank.

In certain embodiments, the clean water holding tank may be formed within a wall of a portable toilet shell. The wall of the portable toilet shell may be selected from the group consisting of a top wall, one or more side walls, a bottom wall, and combinations thereof.

Further disclosed herein is a solid/liquid separation system for a portable toilet. The solid/liquid separation system may comprise a waste holding tank, a plurality of first perforated plates, a first separation chamber, a second separation chamber, a third separation chamber, and a fourth separation chamber. The waste holding tank may have at least one waste holding tank inlet, a bottom wall, and at least one sidewall. The plurality of first perforated plates may be connected to the sidewall of the waste holding tank below the waste holding tank inlet.

The first separation chamber may comprise a first vertical wall and an overflow shelf. The overflow shelf may be connected to a first vertical wall top surface. The first vertical wall will have a first vertical wall height. The first vertical wall may be connected to the bottom wall and the at least one sidewall of the waste holding tank.

The second separation chamber may comprise a second vertical wall and a plurality of second perforated plates. The plurality of second perforated plates may be connected to a second vertical wall top surface. The plurality of second perforated plates may be located below the overflow shelf. The second vertical wall will have a second vertical wall height. The second vertical wall may be connected to the bottom wall and the at least one sidewall of the waste holding tank.

The third separation chamber may comprise a third vertical wall. The third vertical wall will have a third vertical wall height. The third vertical wall may be connected to the bottom wall and the at least one sidewall of the waste holding tank.

The fourth separation chamber may comprise a fourth vertical wall and at least one third perforated plate. The at least one third perforated plate may be connected to a fourth vertical wall top surface. The fourth vertical wall will have a fourth vertical wall height. The fourth vertical wall may be connected to the bottom wall and the at least one sidewall of the waste holding tank.

Each first perforated plate of the plurality of first perforated plates may be angled in a first direction to direct at least a portion of a fluid flow from the waste holding tank inlet towards the first separation chamber. The overflow shelf may be angled in a second direction opposite the first direction. Each second perforated plate of the plurality of second perforated plates may be angled in a third direction opposite the second direction. The at least one third perforated plate may be angled in a fourth direction opposite the third direction.

The second vertical wall height may be less than the first vertical wall height. The third vertical wall height may be less than the second vertical wall height. The fourth vertical wall height may be less than the third vertical wall height.

In some embodiments, the solid/liquid separation system may further comprise a clean-out pipe connected to the first separation chamber. In certain embodiments, each of the first vertical wall, the second vertical wall, the third vertical wall, and the fourth vertical wall may comprise a one-way valve located proximate to the bottom wall of the waste holding tank.

In certain embodiments, the solid/liquid separation system may further comprise a separated water holding tank. In some embodiments, the solid/liquid separation system may further comprise a centrifugal force basket attached to at least one sidewall of the waste holding tank and located below a discharge point of the plurality of first perforated plates.

Also disclosed herein is a door opening mechanism for a portable toilet. The door opening mechanism may comprise a third foot activated pedal, a door actuator, a door, at least one door connection structure, and a portable toilet shell comprising a door opening.

The third foot activated pedal may be mechanically connected to the door actuator. The door actuator may be mechanically connected to the door. The door may be connected to the portable toilet shell at the door opening by the at least one door connection structure.

The door actuator may be configured to open the door when the third foot activated pedal is in a partially compressed or fully compressed position. The door actuator may be configured to close the door when the third foot activated pedal is in a fully uncompressed position.

In some embodiments, the door actuator may be selected from the group of actuators consisting of one or more pulleys and a cable, one or more pneumatic actuators, one or more hydraulic actuators, one or more electric actuators, and combinations thereof. In certain embodiments, the third foot activated pedal may be incorporated into a wheelchair accessible ramp.

In some embodiments, the at least one door connection structure may comprise at least one door hinge. In other embodiments, the at least one door connection structure may comprise at least one door track.

DETAILED DESCRIPTION

Figure 1:
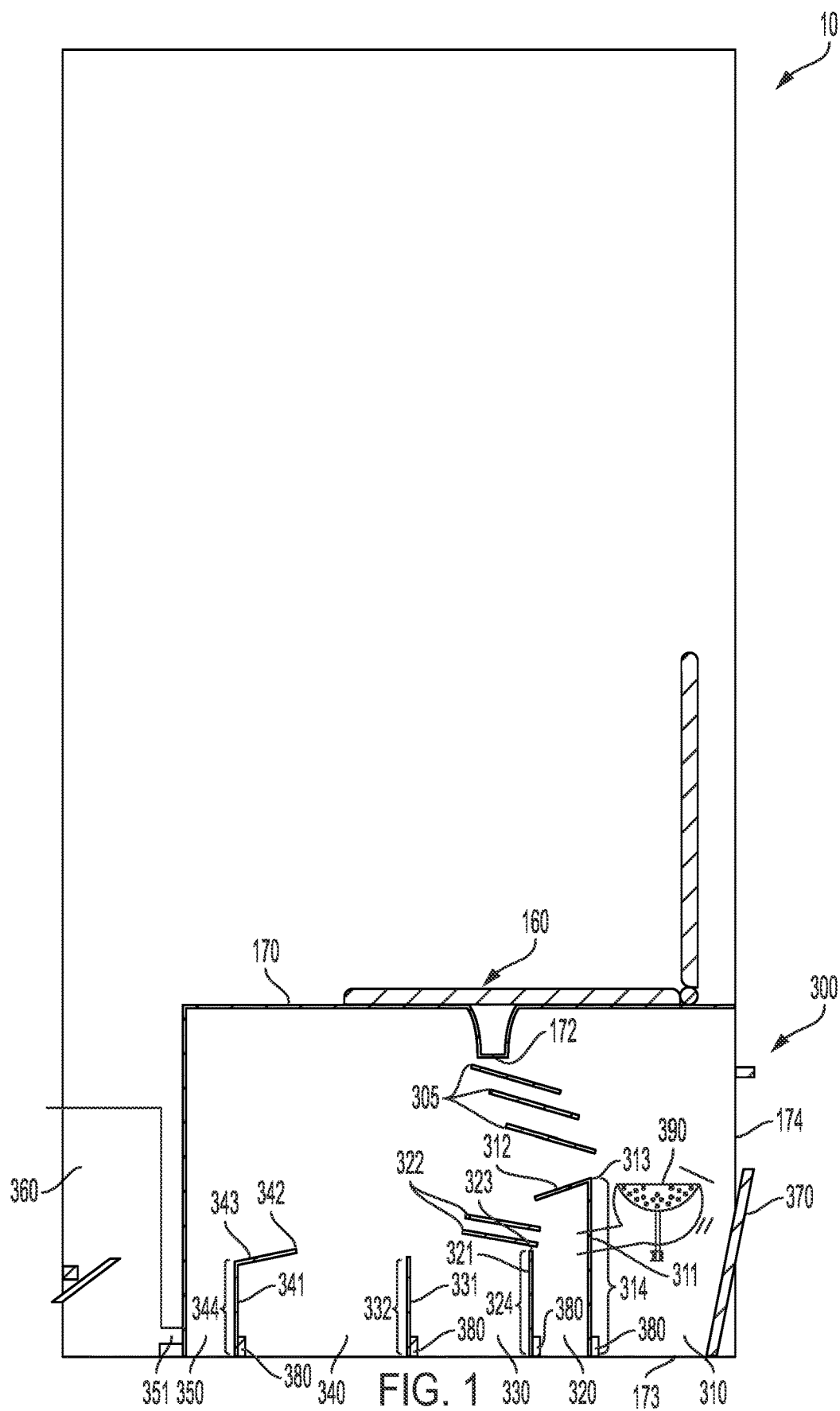
FIG. 1 is a cut-away side view of a solid/liquid separation system for a portable toilet.

This invention is to an improved portable toilet, and improved devices for use in a portable toilet. Reference will now be made to the various Figures in which, unless otherwise noted, like numbers refer to like structures. As described herein and in the claims, the following numbers refer to the following structures as noted in the Figures.

10 refers to a portable toilet.
12 refers to a portable toilet shell.
15 refers to a door opening.
100 refers to a flushing mechanism.
110 refers to a clean water holding tank.
120 refers to a pump.
130 refers to a pressure tank.
131 refers to a pressure tank inlet.
132 refers to a diaphragm.
133 refers to a pressure release valve.
134 refers to a limiting valve.

135 refers to a fluid connection line.
140 refers to an actuator.
150 refers to a first foot activated pedal.
160 refers to a toilet bowl.
161 refers to an upper ring (of a toilet bowl).
170 refers to a waste holding tank.
171 refers to a dump valve.
172 refers to a holding tank inlet.
173 refers to a bottom wall.
174 refers to a sidewall.
200 refers to a urinal flushing mechanism.
210 refers to a second foot activated pedal.
220 refers to a valve assembly.
230 refers to an upper valve mechanism.
240 refers to a lower valve mechanism.
250 refers to a urinal.
300 refers to a solid/liquid separation system.
305 refers to first perforated plates.
310 refers to a first separation chamber.
311 refers to a first vertical wall.
312 refers to an overflow shelf.
313 refers to a first vertical wall top surface.
314 refers to a first vertical wall height.
320 refers to a second separation chamber.
321 refers to a second vertical wall.
322 refers to second perforated plates.
323 refers to a second vertical wall top surface.
324 refers to a second vertical wall height.
330 refers to a third separation chamber.
331 refers to a third vertical wall.
332 refers to a third vertical wall height.
340 refers to a fourth separation chamber.
341 refers to a fourth vertical wall.
342 refers to a third perforated plate.
343 refers to a fourth vertical wall top surface.
344 refers to a fourth vertical wall height.
350 refers to a fifth separation chamber.
351 refers to an outlet.
360 refers to a separated water holding tank.
370 refers to a clean-out pipe.
380 refers to a one-way valve.
390 refers to a centrifugal force basket.
400 refers to a door opening mechanism.
410 refers to a third foot activated pedal.
420 refers to a door actuator.
430 refers to a door.
440 refers to a door connection structure.

Corresponding reference characters indicate corresponding parts throughout the several views in the Figures. Although the exemplification set out herein illustrates an embodiment of the invention, in one form, the embodiment disclosed below is not intended to be exhaustive or to be construed as limiting the scope of the invention to the precise form disclosed.

Figure 3:
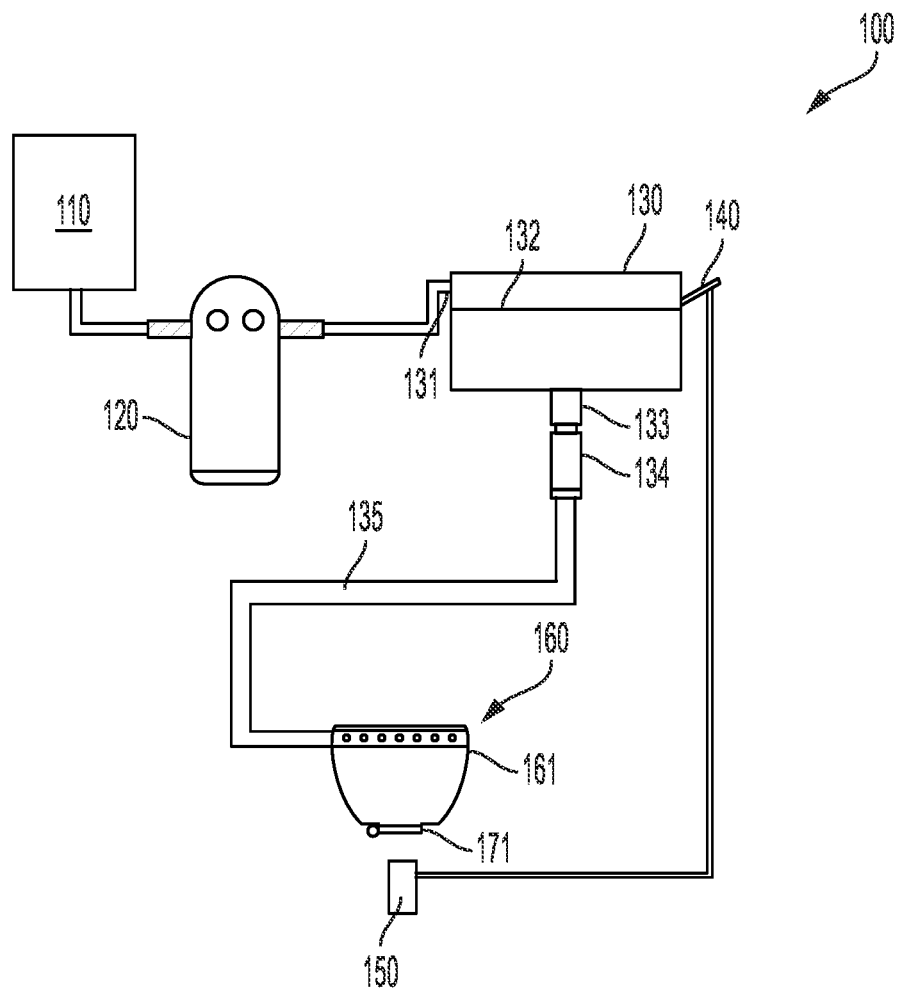
FIG. 3 is a cut-away side view of a toilet flushing system for a portable toilet.

FIG. 1 shows a cut-away side view of a portable toilet (10) comprising a solid/liquid separation system (300). As shown in FIG. 1, the solid/liquid separation system comprises a waste holding tank (170) having at least one waste holding tank inlet (172). The waste holding tank inlet may be a fluid connection between the waste holding tank and a toilet bowl (160). In some embodiments, the fluid connection between the waste holding tank and the toilet bowl may include a dump valve (171 as shown in FIG. 3) which remains in a closed position unless and until acted on by an actuator upon engaging a flushing mechanism-which in some embodiments may be the flushing mechanism (100) disclosed herein and/or the urinal flushing mechanism (200) disclosed herein. One non-limiting example of such a flushing mechanism is disclosed herein with reference to FIG. 3.

The waste holding tank (170) may also comprise a bottom wall (173) and at least one sidewall (174). The size and shape of the bottom wall and the sidewall(s) is not considered important. However, the sidewall(s) will preferably be connected to the bottom wall in such a manner that the assembly of sidewall(s) and bottom wall forms a fluid tight, hollow container within which waste from the portable toilet may reside without leaking.

The waste holding tank (170) may include a vent pipe (not shown) connected between the waste holding tank and extending through at least one wall—preferably the roof—of the portable toilet shell. At least one valve (not shown)—such as a check valve—may be located within a length of the vent pipe. When present, this vent pipe allows air to escape the waste holding tank and exit the portable toilet shell to be vented to atmosphere thereby reducing the intensity of the smell within the portable toilet shell that is associated with fecal and urine matter.

In some embodiments, the vent pipe may also include an electrical fan (not shown) located within the length of the vent pipe, preferably at a level above the (optional) valve. The electrical fan may be powered by an electricity source, which may include a solar powered battery or a hard wire to an existing electrical grid. The electrical fan may be connected to an electrical timer (not shown) which controls when the fan is turned on and off. When the fan is turned on, it may direct air in a direction of the exterior of the portable toilet shell (12), in turn opening the valve. This not only improves the reduction in smell intensity within the portable toilet shell, it also provides a cooling effect to the interior of the portable toilet shell making for a more comfortable user experience on hot days.

Figure 2:
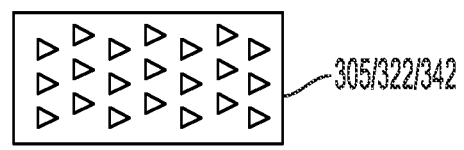
FIG. 2 is a top view of a perforated plate for a solid/liquid separation system for a portable toilet.

Within the waste holding tank (170) may be a plurality of first perforated plates (305). Each perforated plate of the plurality of first perforated plate(s) may be connected to a sidewall (174) of the waste holding tank below the waste holding tank inlet (172). Preferably, each first perforated plate of the plurality of first perforated plates will be angled in a first direction to direct at least a portion of a fluid flow from the waste holding tank inlet (171) towards the first separation chamber (310). In angling the first perforated plate(s) in such a way, waste existing the toilet bowl (160) passes over and through the plurality of first perforated plates such that a first portion of solids from the waste remains on one or more of the first perforated plates while a second portion of the solids along with a first portion of liquids from the waste enters the first separation chamber of the waste holding tank as described below. This can be thought of as separating a first portion of the solids in the waste from the liquids. One example of a perforated plate is shown in top-view in FIG. 2.

As shown in FIG. 1, the solid/liquid separation system (300) may also comprise a first separation chamber (310). The first separation chamber may comprise a first vertical wall (311) and an overflow shelf (312) connected to a first vertical wall top surface (313). The overflow shelf will preferably be angled in a second direction opposite the first direction to which the plurality of first perforated plates (305) are angled. In doing so, the overflow shelf acts to prevent all or a portion of solids from the waste within the first separation chamber from flowing over the first vertical wall and into the second separation chamber (320). The first vertical wall will have a first vertical wall height (314) measured from the bottom wall (173) of the waste holding tank (170) to the first vertical wall top surface. Preferably, the first vertical wall will be connected to the bottom wall and at least one sidewall of the waste holding tank.

FIG. 1 also shows the solid/liquid separation system (300) comprising a second separation chamber (320). The second separation chamber may comprise a second vertical wall (321) and a plurality of second perforated plates (322) connected to a second vertical wall top surface (323) and/or one or more of the sidewall(s) (174). Each second perforated plate of the plurality of second perforated plates may be located below the overflow shelf (312) of the first separation chamber (310). Preferably, each second perforated plate of the plurality of second perforated plates will be angled in a third direction opposite the second direction to which the overflow shelf is angled.

The second vertical wall (321) will have a second vertical wall height (324) measured from the bottom wall (173) of the waste holding tank (170) to the second vertical wall top surface. The second vertical wall height will preferably be less than the first vertical wall height (314). The amount that the second vertical wall height is less than the first vertical wall height may be in a range selected from the group consisting of at least 1% less, at least 5% less, at least 10% less, and at least 20% less. Preferably, the second vertical wall will be connected to the bottom wall and at least one sidewall (174) of the waste holding tank.

As the first separation chamber (310) fills with the second portion of the solids and the first portion of the liquids—the second portion of the solids will naturally settle towards the bottom of the first separation chamber. As the first separation chamber becomes full, a second portion of the liquids along with a third portion of the solids will exit the first separation chamber and enter the second separation chamber (320). In doing so, the second portion of the liquids along with the third portion of the solids will pass over the overflow shelf, and over and through the plurality of second perforated plates (322) such that a fourth portion of solids from the waste remains on one or more of the second perforated plates while a fifth portion of the solids along with a third portion of liquids from the waste enters the second separation chamber (310) of the waste holding tank. This can be thought of as separating a fourth portion of the solids in the waste from the liquids. One example of a perforated plate of the plurality of second perforated plates is shown in top-view in FIG. 2.

Also shown in FIG. 1 is a third separation chamber (330). As shown in FIG. 1, the third separation chamber may comprise a third vertical wall (331). The third vertical wall will have a third vertical wall height (332) measured from the bottom wall (173) of the waste holding tank (170) to the third vertical wall top surface. The third vertical wall height will preferably be less than the second vertical wall height (324). The amount that the third vertical wall height is less than the second vertical wall height may be in a range selected from the group consisting of at least 1% less, at least 5% less, at least 10% less, and at least 20% less. Preferably, the third vertical wall will be connected to the bottom wall and at least one sidewall (174) of the waste holding tank.

As the second separation chamber (320) fills with the fifth portion of the solids along with the third portion of the liquids—the fifth portion of the solids will naturally settle towards the bottom of the second separation chamber. As the second separation chamber becomes full, a fourth portion of the liquids along with a sixth portion of the solids will exit the second separation chamber and enter the third separation chamber (330). This can be thought of as separating the fifth portion of the solids in the waste from the liquids.

FIG. 1 further shows a fourth separation chamber (340). As shown in FIG. 1, the fourth separation chamber may comprise a fourth vertical wall (341) and at least one third perforated plate (342) connected to a fourth vertical wall top surface (343). Preferably, each third perforated plate of the plurality of third perforated plates will be angled in a fourth direction opposite the third direction to which the plurality of second perforated plates (322) are angled.

The fourth vertical wall (341) will have a fourth vertical wall height (344) measured from the bottom wall (173) of the waste holding tank (170) to the fourth vertical wall top surface. The fourth vertical wall height will preferably be less than the third vertical wall height (332). The amount that the fourth vertical wall height is less than the third vertical wall height may be in a range selected from the group consisting of at least 1% less, at least 5% less, at least 10% less, and at least 20% less. Preferably, the fourth vertical wall will be connected to the bottom wall and at least one sidewall (174) of the waste holding tank.

As the third separation chamber (330) fills with the sixth portion of the solids along with the fourth portion of the liquids—the sixth portion of the solids will naturally settle towards the bottom of the third separation chamber. As the third separation chamber becomes full, a fifth portion of the liquids along with a seventh portion of the solids will exit the third separation chamber and enter the fourth separation chamber (340).

Further shown in FIG. 1 is a fifth separation chamber (350). As the fourth separation chamber (340) fills with the fifth portion of the liquids along with the seventh portion of the solids—the seventh portion of the solids will naturally settle towards the bottom of the fourth separation chamber. As the fourth separation chamber becomes full, a sixth portion of the liquids along with an eighth portion of the solids will exit the fourth separation chamber and enter the fifth separation chamber. In doing so, the sixth portion of the liquids along with the eighth portion of the solids will pass through the plurality of third perforated plates (342) such that a ninth portion of solids from the waste remains on one or more of the third perforated plates while a tenth portion of the solids along with the sixth portion of liquids from the waste enters the fifth separation chamber of the waste holding tank. This can be thought of as separating an ninth portion of the solids in the waste from the liquids. One example of a perforated plate of the plurality of third perforated plates is shown in top-view in FIG. 2.

Within the fifth separation chamber (350) the waste will preferably comprise at least 90% liquid by volume with at least 95% liquid by volume being more preferred, at least 99% liquid by volume being still more preferred, and 100% liquid by volume being most preferred. The composition of the waste within the fifth separation chamber may also be expressed based on the amount of solids by volume with no more than 10% solids by volume being preferred, no more than 5% solids by volume being more preferred, no more than 1% solids by volume being still more preferred, and 0% solids by volume being most preferred. In some embodiments, as the fifth separation chamber (350) fills with waste, the liquids may be recycled into a separated water holding tank (360). This separated water holding tank may be used—in whole or in part—as a source of water for flushing a toilet bowl or a urinal as disclosed herein.

In certain embodiments, the solid/liquid separation system (300) may comprise a clean-out pipe (370) fluidly connected to the first separation chamber. When a clean-out pipe is present it is preferred that each of the first vertical wall, the second vertical wall, the third vertical wall, and the fourth vertical wall comprise a one-way valve (380) located proximate to the bottom wall (173) of the waste holding tank (170). This allows a suction device—such as a vacuum truck—to attach to the clean-out pipe to suction waste out of the waste holding. The one-way valves allow a passage between the various separation chambers to open when acted upon by suction applied through the clean-out pipe thereby allowing waste within the separation chambers to flow in the direction of the first separation chamber and eventually exit the waste holding tank into the suction device. Preferably, the bottom wall will include a channel below the one-way valves to direct liquid waste into the channel for removal through the clean-out pipe.

Some embodiments of the solid/liquid separation system (300) may also comprise a centrifugal force basket (390). When present, the centrifugal force basket may be rotatably attached to at least one sidewall (174) of the waste holding tank. Preferably, the centrifugal force basket will be located below a discharge point of the plurality of first perforated plates such that—as waste runs off the plurality of first perforated plates—it encounters the centrifugal force basket which further separates solids from liquids before the waste is deposited into the first separation chamber (310).

FIG. 3 shows one view of a flushing mechanism (100) for a portable toilet (10). As shown in FIG. 3, the flushing mechanism comprises a clean water holding tank (110), a pump (120), a pressure tank (130), an actuator (140), a first foot activated pedal (150), a toilet bowl (160), and a waste holding tank (170) which in some embodiments may be the waste holding tank of the solid/liquid separation system (300) disclosed herein and shown in FIG. 1.

The clean water holding tank (110) is fluidly connected to the pump (120) such that the pump draws water from the clean water holding tank and passes it to the pressure tank (130). As shown in FIG. 3, the pressure tank may comprise a pressure tank inlet (131) (which is fluidly connected to the pump), a diaphragm (132), and a pressure tank outlet. Preferably, the pump will be an electrically activated pump. Electricity for the electrically activated pump may be provided by a solar powered battery and/or by a hard wire to an electrical grid. The pressure tank outlet is fluidly connected to a pressure release valve (133). In some embodiments, the pressure release valve is then fluidly connected to a limiting valve (134).

The pressure release valve (133) will be fluidly connected to the toilet bowl (160) with at least a portion of a fluid connection line (135) between the pressure release valve and the toilet bowl residing within an upper ring (161) of the toilet bowl. When the limiting valve (134) is present, the fluid connection may be between the limiting valve and the toilet bowl with the portion of the fluid connection line residing within the upper ring of the toilet bowl being a portion of the fluid connection line between the limiting valve and the toilet bowl. A portion of the fluid connection line-preferably at least a portion of which resides within the upper ring of the toilet bowl-comprises at least one perforation, and preferably a series of spaced perforations, which allows water to exit the fluid connection line and enter the toilet bowl.

The toilet bowl (160) is fluidly connected to the waste holding tank (170 as shown in FIG. 1). Preferably, the fluid connection between the toilet bowl and the waste holding tank will comprise a dump valve (171)—such as a gate valve-which prevents waste from leaving the toilet bowl until the dump valve is opened.

The actuator (140) is mechanically connected to the first foot activated pedal (150). The first foot activated pedal is also mechanically connected to the dump valve (171). Accordingly, when the first foot activated pedal is in a compressed or a partially compressed position, both the dump valve and the pressure release valve (133) are configured to open. This allows water from the pressure tank (130) to flow into the toilet bowl (170) through the perforation in the fluid connection line residing within the upper ring (161) of the toilet bowl with said water and at least a portion of the waste in the toilet bowl exiting the toilet bowl and entering the waste holding tank (170) through the open dump valve. When the first foot activated pedal is in a fully uncompressed position, the dump valve and the pressure release valve are configured to close stopping the flow of water from the pressure tank into the toilet bowl.

In some embodiments, the clean water holding tank (110) for the flushing mechanism (100) may be formed within a wall of the portable toilet shell (12). Said wall may be selected from the group consisting of a top wall, one or more side walls, a bottom wall, and combinations thereof.

In certain embodiments, the toilet bowl (160) may include a cylinder (not shown) below the level of the upper ring (161) and above the level of the dump valve (171). Solid and liquid waste may pass over the cylinder. When the first foot activated pedal (150) is pressed by a user, it may further trigger a squeegee mechanism (not shown) to pass across the outer surface of the cylinder one or more times to remove solid waste from the cylinder surface and direct it into the toilet bowl and eventually through the dump valve.

Figure 4:
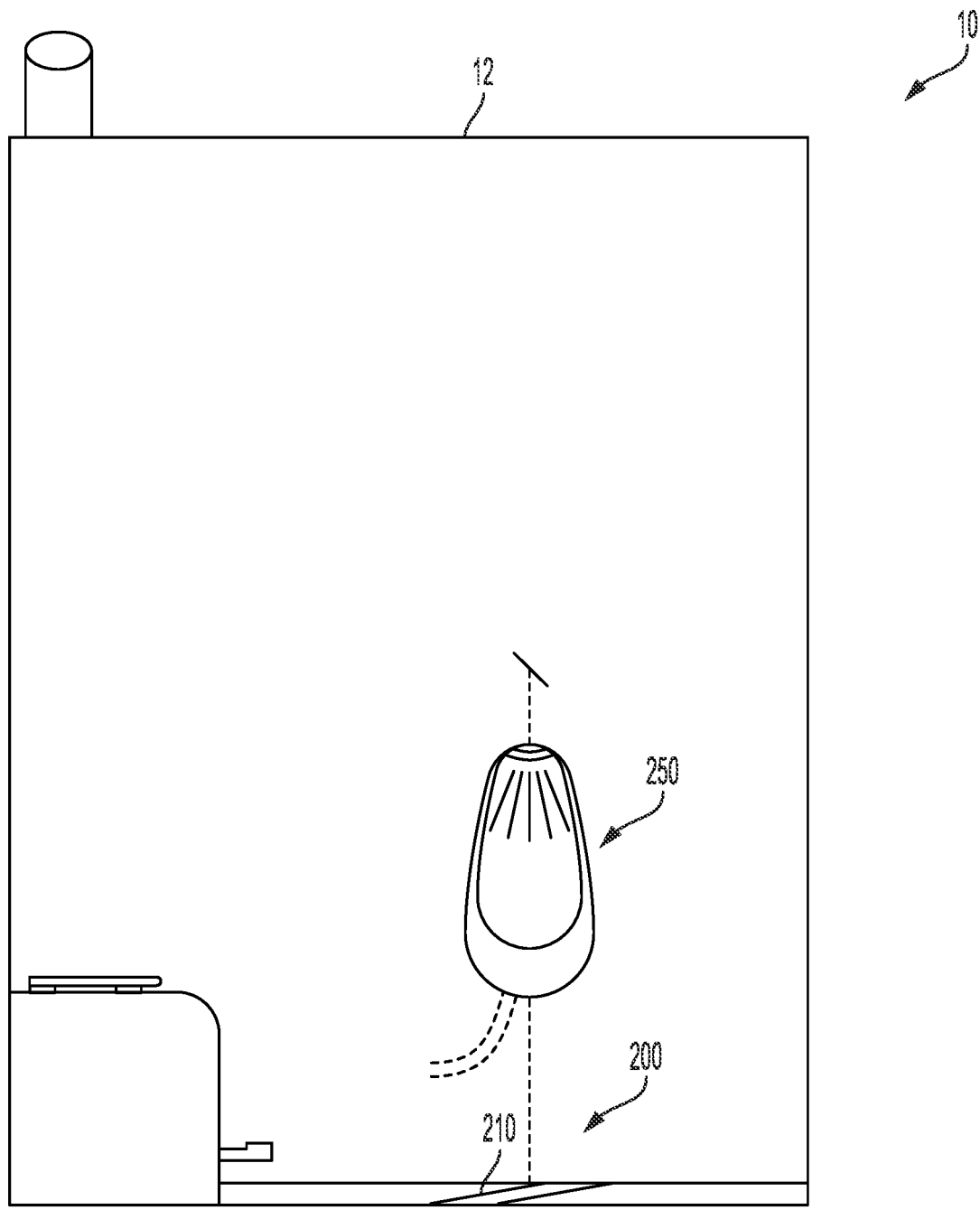
FIG. 4 is a cut-away side view of a urinal flushing system for a portable toilet.

FIG. 4 shows one view of a urinal flushing mechanism (200) for a portable toilet (10). As shown in FIG. 4, the urinal flushing mechanism may comprise a clean water holding tank (110 as shown in FIG. 3), a second foot activated pedal (210), a valve assembly (220 as shown in FIGS. 5A-5C), a urinal (250), and a waste holding tank (170 as shown in FIG. 3) which in some embodiments may be the waste holding tank of the solid/liquid separation system (300) disclosed herein.

Figure 5A:
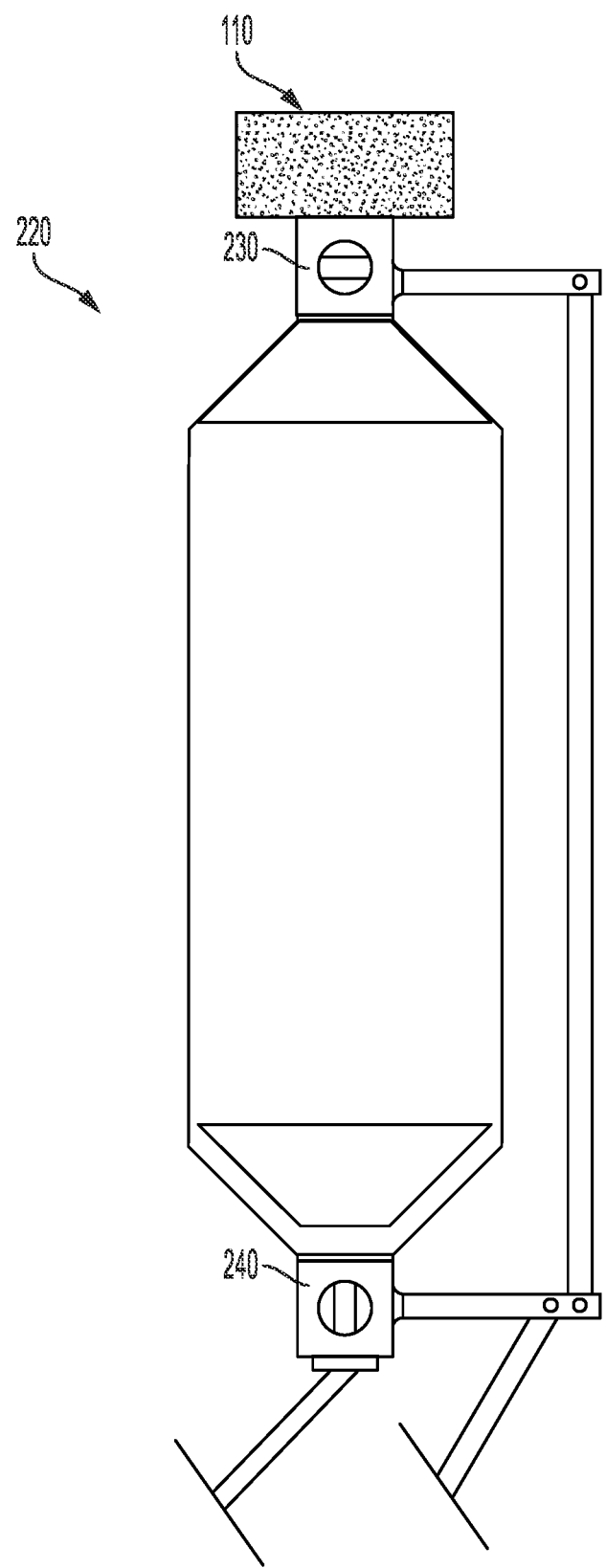
FIG. 5A is a cut-away side view of one stage of a valve assembly for a urinal flushing system for a portable toilet.
Figure 5B:
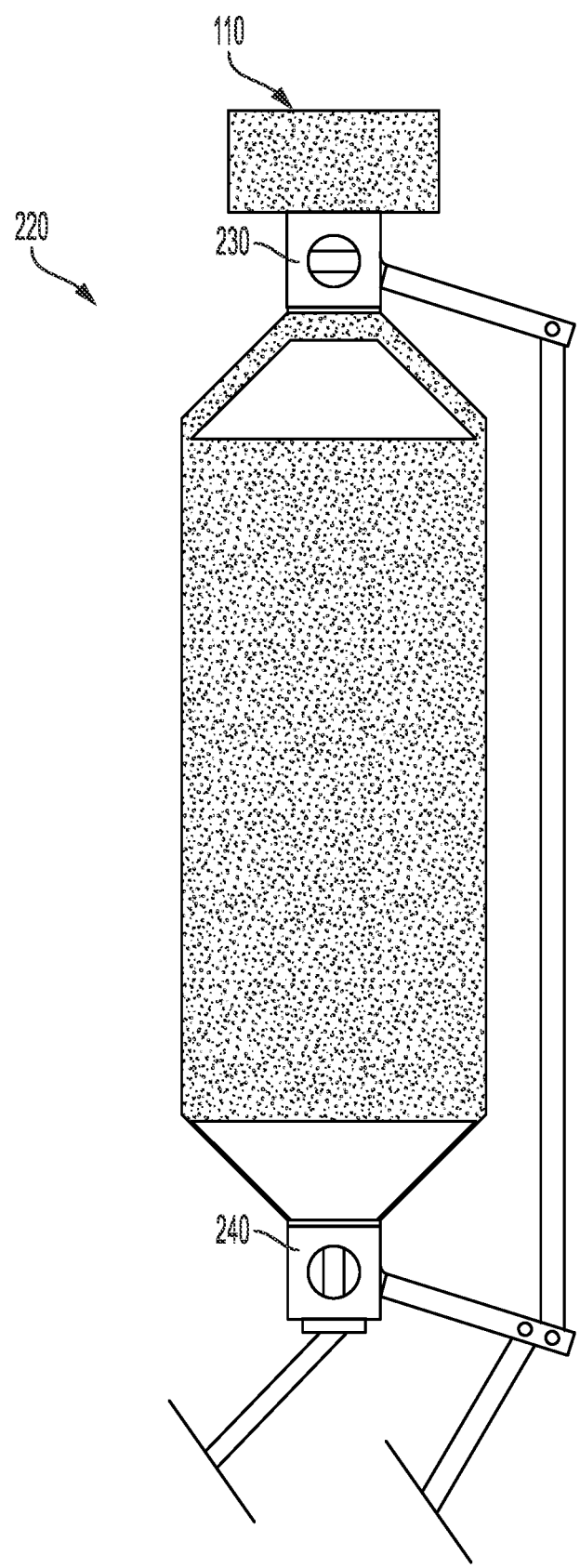
FIG. 5B is a cut-away side view of another stage of a valve assembly for a urinal flushing system for a portable toilet.
Figure 5C:
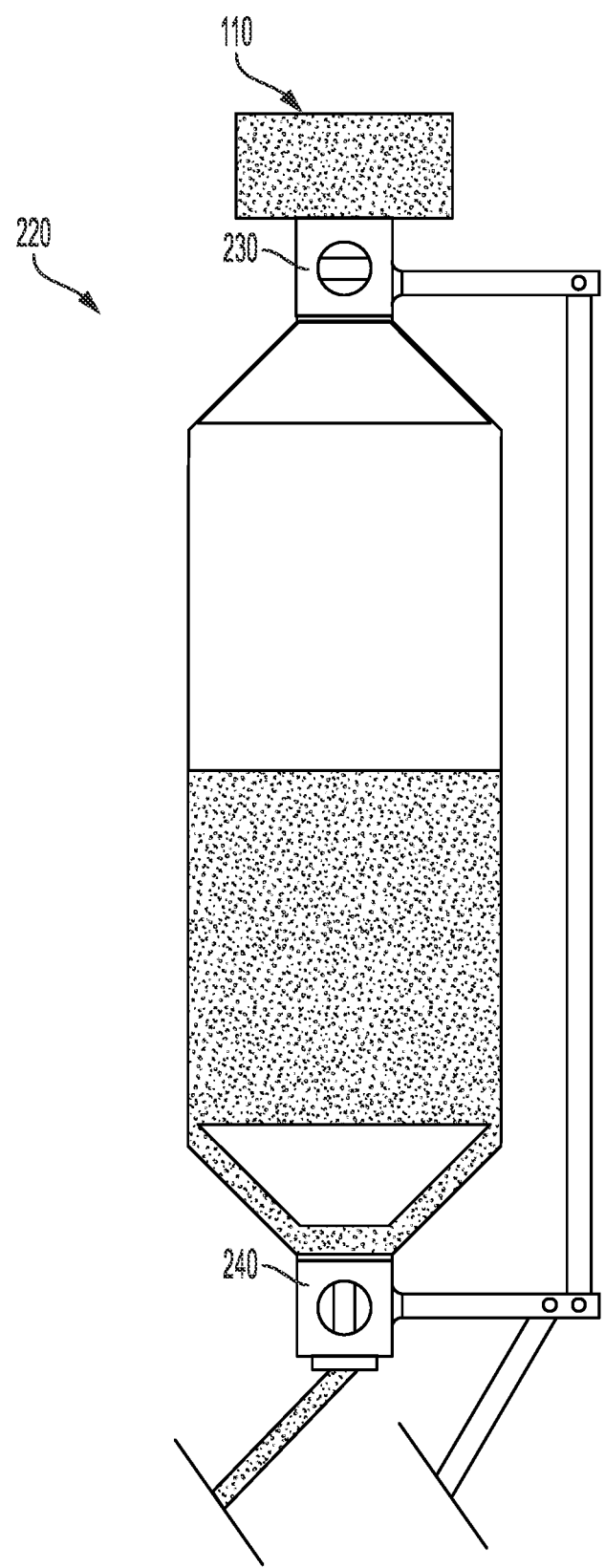
FIG. 5C is a cut-away side view of still another stage of a valve assembly for a urinal flushing system for a portable toilet.

FIGS. 5A, 5B, and 5C show the valve assembly (220) in various phases of a flushing cycle. As shown in FIGS. 5A, 5B, and 5C, the valve assembly (220) comprises an upper valve mechanism (230), a lower valve mechanism (240), and a valve assembly body spanning at least the distance between the upper valve mechanism and the lower valve mechanism. The clean water holding tank (110) being fluidly connected to the upper valve mechanism. The lower valve mechanism is then fluidly connected to the urinal (250) with the urinal being fluidly connected to the waste holding tank.

FIG. 5A shows a first phase of the flushing cycle for the flushing mechanism. In this first phase, the upper valve mechanism (230) is in an upper valve mechanism closed position. In such a position, water from the clean water holding tank (110) is prevented from entering the valve assembly body.

In FIG. 5B, a second phase of the flushing cycle for the flushing mechanism is shown. In this phase, the second foot activated pedal (210) is partially or fully compressed. When partially or fully compressed, the second foot activated pedal acts upon the upper valve mechanism (230) to partially or fully open the upper valve mechanism. Accordingly, the upper valve mechanism may be thought of as being in an upper valve mechanism opened position or an upper valve mechanism partially opened position. The second foot activated pedal may act upon the upper valve mechanism using any number of actuators, including pully and cable actuators, pneumatic actuators, hydraulic actuators, electronic actuators, and combinations thereof. Similarly, the lower valve mechanism (240) is configured to be in a lower valve mechanism closed position. This allows water from the clean water holding tank (110) to enter the valve assembly body through the upper valve mechanism, while preventing said water from exiting the valve assembly and entering the urinal.

FIG. 5C shows a third phase of the flushing cycle for the flushing mechanism. In this phase, the second foot activated pedal (210) is released back to a fully uncompressed position. When fully uncompressed, the second foot activated pedal acts upon the upper valve mechanism (230) to fully close the upper valve mechanism, and acts upon the lower valve mechanism (240) to partially or fully open the lower valve mechanism. Accordingly, the upper valve mechanism may be thought of as being in an upper valve mechanism closed position, while the lower valve mechanism may be thought of as being in a lower valve mechanism opened position or a lower valve mechanism partially opened position. The second foot activated pedal may act upon the upper valve mechanism and the lower valve mechanism using any number of actuators, including pully and cable actuators, pneumatic actuators, hydraulic actuators, electronic actuators, and combinations thereof. This allows the water that entered the valve assembly body in the second phase to exit the valve assembly body and flow into and through the urinal—eventually exiting the urinal into the waste holding tank (170). In some embodiments, the water—which at this point includes urine that was deposited in the urinal—may pass through a urine trap located in the fluid connection between the urinal and the waste holding tank.

The upper valve mechanism (230) and/or the lower valve mechanism (240) may be any number of different types of valves which are well known and conventionally available. One preferred type of valve is a ball valve wherein the upper valve mechanism may be a first ball valve and/or the lower valve mechanism may be a second ball valve.

Another valve mechanism may comprise a series of plates which may be slideably connected within the valve assembly body. In such an embodiment, the upper valve mechanism may comprise a first pair of plates and/or the lower valve mechanism may comprise a second pair of plates.

In such an embodiment, the second foot activated pedal (210) may be configured to slide the first pair of plates and the second pair of plates towards an upper end of the valve assembly body when the second foot activated pedal is in a fully uncompressed position. This allows water from the clean water holding tank (110) to flow past the first pair of plates and into the valve assembly body. Simultaneously, the second pair of plates closes the fluid connection between the valve assembly body and the urinal, preventing the clean water from exiting the valve assembly body and entering the urinal (250).

When the second foot activated pedal (210) is partially or fully compressed position, the first pair of plates and the second pair of plates slides towards a lower end of the valve assembly body. This allows the water that entered the valve assembly body when the second foot activated pedal was in the fully uncompressed position to exit the valve assembly body by flowing past the second pair of plates and into the fluid connection between the valve assembly body and the urinal.

In some embodiments, the clean water holding tank (110) for the urinal flushing mechanism (200) may be formed within a wall of the portable toilet shell (12). Said wall may be selected from the group consisting of a top wall, one or more side walls, a bottom wall, and combinations thereof.

The clean water holding tank may also include a heat exchanger system (not shown) comprising a heating element, a plurality of tubes through which a fluid (which may be a portion of the clean water) passes, a heating element and preferably a fan. The heating element-which may be an electrical heating element that receives electricity from a solar powered battery and/or a hard wire to an electrical grid-applies heat to the heating coils which circulate heated water throughout the clean water holding tank to prevent water within the clean water holding tank from freezing.

In some such embodiments, a portion of the tubes may extend into and/or through a toilet seat that is attached to the toilet bowl. In doing so, a portion of the heated fluid within the tube provides a heat source to the toilet seat, thereby providing a more comfortable user experience, particularly in cold weather applications.

Figure 6:
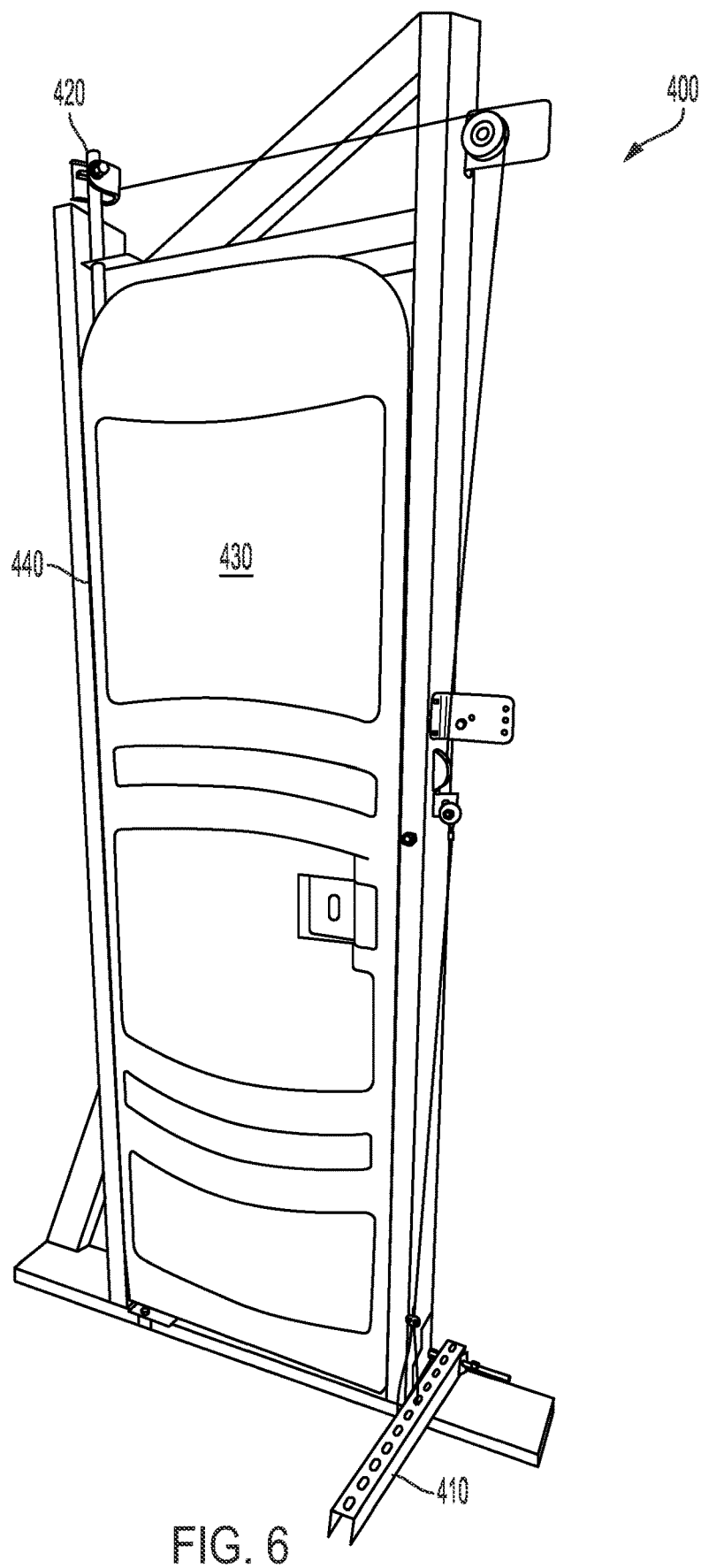
FIG. 6 is a perspective view of a door opening mechanism for a portable toilet in a closed position.
Figure 7:
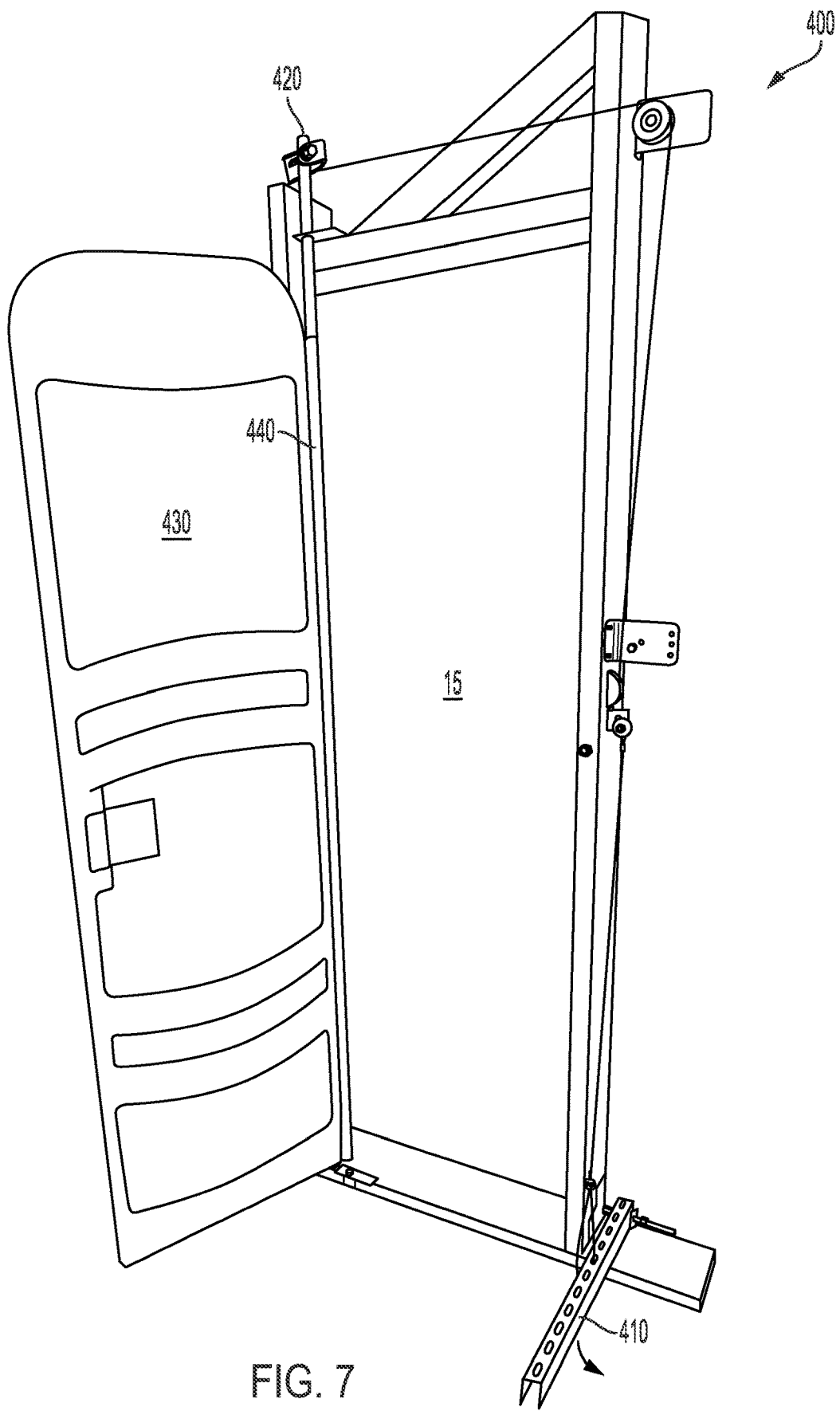
FIG. 7 is a perspective view of a door opening mechanism for a portable toilet in an open position.

FIG. 6 and FIG. 7 show an embodiment of a door opening mechanism (400) for a portable toilet with the door being shown in a closed position in FIG. 6 and in an opened position in FIG. 7. As shown in FIG. 6 and FIG. 6, the door opening mechanism may comprise a third foot activated pedal (410), a door actuator (420), a door (430), at least one door connection structure (440), and a portable toilet shell (120) comprising a door opening (15).

The door (430) is connected to the portable toilet shell (12) at the door opening (15) by the at least one door connection structure (440). In some embodiments, the door connection structure may be at least one door hinge as shown in FIG. 6 and FIG. 7. Alternatively, the door connection structure may be at least one door track such that the door opens and closes by sliding along the door track(s).

The door actuator (420) is mechanically connected to the door (430). Many different types of door actuators may be used-including pulley(s) and a cable, pneumatic actuator(s), hydraulic actuator(s), and electric actuator(s). That is to say that the door actuator may be selected from the group consisting of one or more pulleys and a cable, one or more pneumatic actuators, one or more hydraulic actuators, one or more electric actuators, and combinations thereof. When the door actuator is an electric actuator, electricity for operating the electric actuator may be provided by a solar powered battery and/or a hard wire connection to an electrical grid.

The third foot activated pedal (410) is mechanically connected to the door actuator. Accordingly, when the third foot activated pedal is in a partially compressed or fully compressed position, the door actuator (420) is configured to open the door (430) as shown in FIG. 6. Conversely, when the third foot activated pedal is in a fully uncompressed position, the door actuator is configured to close the door as shown in FIG. 7. In some embodiments, the third foot activated pedal may be incorporated into a wheelchair accessible ramp. The third foot activated pedal (410) may also include an interior third foot activated pedal (not shown) located within the interior of the portable toilet shell which—when compressed by a users foot or a wheelchair, serves to activate a door lock.

A number of different optional features may also be incorporated into the portable toilet system. Among the optional features may be a heater, a heated toilet seat, one or more ultraviolet disinfecting systems, a hand-sanitizing station, one or more vents, and combinations thereof.

The various systems, mechanisms, and structures disclosed herein result in a portable toilet which provides users with a more sanitary experience. Clean water is available to flush the toilet via the flushing mechanism and/or flushing the urinal via the urinal flushing mechanism after each use. This prevents the buildup of feces and/or urine within the toilet bowl and/or the urinal which can lead to odor and touch sanitation issues. The dump valve—in addition to assisting in the flushing operation—also creates a seal to isolate the waste holding tank from the user occupied internal area of the portable shell. Utilizing foot pedals for opening the door, flushing the toilet bowl, and flushing the urinal eliminates the need for a user to touch surfaces with their hands which may be contaminated with various harmful or undesirable microbes. Finally, the solid/liquid separation system allows for feces and other solid waste to be separated from liquids which can be recycled to fresh water for future flushing operations.

Embodiments of a portable toilet may include any one or more of the systems, mechanisms, and structures disclosed herein. For example, one embodiment of a portable toilet may include the flushing mechanism disclosed herein. Another embodiment of a portable toilet may include the urinal flushing mechanism disclosed herein. Still another embodiment of a portable toilet may include the solid/liquid separation system disclosed herein. A further embodiment of a portable toilet may include the door opening mechanism disclosed herein.

One embodiment of a portable toilet may include the flushing mechanism disclosed herein and the urinal flushing mechanism disclosed herein. Another embodiment of a portable toilet may include the flushing mechanism disclosed herein and the solid/liquid separation system disclosed herein. Still another embodiment of a portable toilet may include the flushing mechanism disclosed herein and the door opening mechanism disclosed herein.

One embodiment of a portable toilet may include the flushing mechanism disclosed herein, the urinal flushing mechanism disclosed herein, and the solid/liquid separation system disclosed herein. Another embodiment of a portable toilet may include the flushing mechanism disclosed herein, the urinal flushing mechanism disclosed herein, and the door opening mechanism disclosed herein. Yet another embodiment of a portable toilet may include the flushing mechanism disclosed herein, the solid/liquid separation system disclosed herein, and the door opening mechanism disclosed herein. Still another embodiment of a portable toilet may include the flushing mechanism disclosed herein, the urinal flushing mechanism disclosed herein, the solid/liquid separation system disclosed herein, and the door opening mechanism disclosed herein.

One embodiment of a portable toilet may include the urinal flushing mechanism disclosed herein and the solid/liquid separation system disclosed herein. Another embodiment of a portable toilet may include the urinal flushing mechanism disclosed herein and the door opening mechanism disclosed herein. Yet another embodiment of a portable toilet may include the urinal flushing system disclosed herein, the solid/liquid separation system disclosed herein, and the door opening mechanism disclosed herein. Still another embodiment of a portable toilet may include the solid/liquid separation system and the door opening mechanism disclosed herein.

While the invention has been described as having an exemplary design, the present invention may be further modified within the spirit and scope of this disclosure. This application is therefore intended to cover any variations, uses, or adaptations of the invention using its general principles.

What is claimed is:

1. A solid/liquid separation system (300) for a portable toilet (10) comprising:
   a waste holding tank (170) having at least one waste holding tank inlet (172), a bottom wall (173), and at least one sidewall (174);
   a plurality of first perforated plates (305) connected to the sidewall of the waste holding tank below the waste holding tank inlet;
   a first separation chamber (310) comprising a first vertical wall (311), and an overflow shelf (312) connected to a first vertical wall top surface (313), said first vertical wall having a first vertical wall height (314) and being connected to the bottom wall and the at least one sidewall of the waste holding tank;
   a second separation chamber (320) comprising a second vertical wall (321), and a plurality of second perforated plates (322) connected to a second vertical wall top surface (323) and located below the overflow shelf, said second vertical wall having a second vertical wall height (324) and being connected to the bottom wall and the at least one sidewall of the waste holding tank;
   a third separation chamber (330) comprising a third vertical wall (331) having a third vertical wall height (332) and being connected to the bottom wall and the at least one sidewall of the waste holding tank;
   a fourth separation chamber (340) comprising a fourth vertical wall (341), and at least one third perforated plate (342) connected to a fourth vertical wall top surface (343), said fourth vertical wall having a fourth vertical wall height (344) and being connected to the bottom wall and the at least one sidewall of the waste holding tank; and wherein
   each first perforated plate of the plurality of first perforated plates is angled in a first direction to direct at least a portion of a fluid flow from the waste holding tank inlet towards the first separation chamber;
   the overflow shelf is angled in a second direction opposite the first direction;
   each second perforated plate of the plurality of second perforated plates is angled in a third direction opposite the second direction;
   the at least one third perforated plate is angled in a fourth direction opposite the third direction;
   the second vertical wall height is less than the first vertical wall height;
   the third vertical wall height is less than the second vertical wall height; and
   the fourth vertical wall height is less than the third vertical wall height.

2. The solid/liquid separation system of claim 1, further comprising a clean-out pipe (370) connected to the first separation chamber.

3. The solid/liquid separation system of claim 2, wherein each of the first vertical wall, the second vertical wall, the third vertical wall, and the fourth vertical wall comprises a one-way valve (380) located proximate to the bottom wall of waste holding tank.

4. The solid/liquid separation system of claim 1, further comprising a separated water holding tank (360).

5. The solid/liquid separation system of claim 1, further comprising a centrifugal force basket (390) rotatably attached to at least one sidewall of the waste holding tank and located below a discharge point of the plurality of first perforated plates.

* * * * *